(12) United States Patent
Kumar

(10) Patent No.: US 6,556,709 B1
(45) Date of Patent: Apr. 29, 2003

(54) METHOD AND METHOD FOR CHARACTERIZING OBJECTS WITHIN AN IMAGE

(75) Inventor: Aruna Kumar, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/223,550

(22) Filed: Dec. 30, 1998

(51) Int. Cl.[7] .................................................. G06K 9/00
(52) U.S. Cl. ...................................... 382/165; 382/199
(58) Field of Search ................................ 382/162, 164, 382/165, 199, 209, 217–219, 305; 707/3, 5, 6, 102, 104

(56) References Cited

U.S. PATENT DOCUMENTS 5,852,823 A * 12/1998 De Bonet ....................... 707/6

* cited by examiner

Primary Examiner—Timothy M. Johnson
(74) Attorney, Agent, or Firm—Kenyon & Kenyon

(57) ABSTRACT

A method for characterizing objects within an image is presented. According to an embodiment of the present invention, a representative color of an object is first identified from an image. The contour of this same object is then determined by identifying regions of the image where the identified color changes to another color. Color and contour data from other images of the same object may be obtained using the above described method to compile a ranges of colors and a range contours which represent the object. This color and contour data (known as the "object signature") is then associated with a name for this particular object and stored. Once an object signature has been defined for a particular object, a database of images may be searched to identify images which include objects matching the object signature. For example, once an object signature for a mountain is determined, this object signature may be used to search a database for all images which include a mountain.

12 Claims, 5 Drawing Sheets

METHOD AND METHOD FOR CHARACTERIZING OBJECTS WITHIN AN IMAGE

BACKGROUND

1. Field

The present invention relates to segmenting objects within an image. More particularly, the present invention relates to defining an object within an image using color and contour information.

2. Background Information

There are currently three major types of image retrieval systems which permit a user to search a database for desired images. However, these systems are unable to effectively search for images which include user specified objects. Each of these three major types of retrieval systems are described in greater detail below.

The first type of image retrieval system is available through various so-called World Wide Web sites on the Internet. Images available through these systems are manually cataloged into predefined categories. This manual cataloging process entails an individual looking at each image, identifying a predominant object within the image, and cataloging the image in a predefined category which best describes the predominant object. For example, an image which shows only a tiger against a solid colored background may be cataloged in a category entitled "animals."

Users who access this first type of image retrieval system, select from among the predefined categories and obtain images. One of the drawbacks of this retrieval system is the subjective nature of the cataloging process. One individual's impression of which object predominates an image may differ from another individual's impression. For example, an image including mountains near a sandy beach and an ocean may be placed in a category entitled "water," or a category entitled "mountains" depending on who catalogs the image. Thus, a user's ability to retrieve this particular image is hindered because the image may be placed in any one of at least two different categories.

A second type of image retrieval system is a software-based system which prompts the user to enter a keyword which describes objects the user wishes to appear in images retrieved by the system. For example, a user may enter "water" as a keyword to obtain images which include water. However, rather than searching for images which include the keyword specified object, these systems search for images which include the predominant color of the keyword object. Thus, if the user enters "water" as a keyword, the system will retrieve all images which include blue as the predominant color. Some of these images may include water, but some may include a vast blue sky and no water.

In an effort to enhance the system's ability to obtain images closer to the user's wishes, some of these systems enable the user to specify a region of the image in which the object should appear. Thus, if a user specifies that water should be located in a lower region of the desired image, the system is less likely to use the predominant color criteria and provide the user with images which include a vast blue sky and no water.

Another drawback of this second type of retrieval system is that these systems do not persuit the user to specify a range of color for an object which should appear in the retrieved images. For example, water in an image may appear in many different shades of blue. If the system searches for only one particular shade of blue, many images which include water of a different shade will not be retrieved for the user.

The third known type of image retrieval system builds on the second type by enabling the user to specify a range of colors for objects which should appear in the retrieved images. In addition to entering a keyword to specify objects which should appear in the retrieved images, the user is able to use pointers to specify the desired intensity of each of the three primary colors (red, green, and blue). Thus, a user may use one pointer to specify the desired shade of blue water and may use another pointer to specify the desired shade of green trees in a forest. The user may also use multiple pointers to specify the desired shade of non-primary colors.

In addition to the limitations described above with respect to the second type of retrieval system, the third type of image retrieval system operates in a manner which assumes human beings may change one of the three primary colors mutually exclusive of the other two. In reality the human eye adjusts all three primary colors simultaneously. Another limitation of the third type of image retrieval system relates to the fact that although these systems are equally sensitive to each of the primary colors, the human eye is not equally sensitive to each of the primary colors. As a result of these differences in how the retrieval system and the human eye adjust/perceive color, the color intensity the user selects by adjusting one of the three pointers and the color intensity within the images retrieved by the system will not likely match.

Accordingly, there is a need for an improved method and apparatus for indexing images in a storage medium so a user may retrieve desired images.

SUMMARY

According to an embodiment of the present invention, a method for characterizing an object within an image is provided. First, the color of the object is identified. The contour of the object is then determined by identifying regions of the image where the identified color changes to another color. Then, the name of the object is associated with the determined color and contour.

DETAILED DESCRIPTION

An object may be defined as any identifiable segment in an image. Most objects which appear in nature (such as mountains, oceans, forests, people and animals) may be defined using a given range of colors. For example, a certain range of blues may reasonably define a daytime sky. Similarly, most objects which appear in nature may be defined by a unique contour or shape. For example, a silhouette of a mountain is rarely mistaken for another object. Although many objects may be identified using color or contour information alone, an object may be more accurately identified if both the color and the contour are known. The present invention characterizes objects within images by associating an object with a range of colors and a range of contours for the object.

Figure 1:
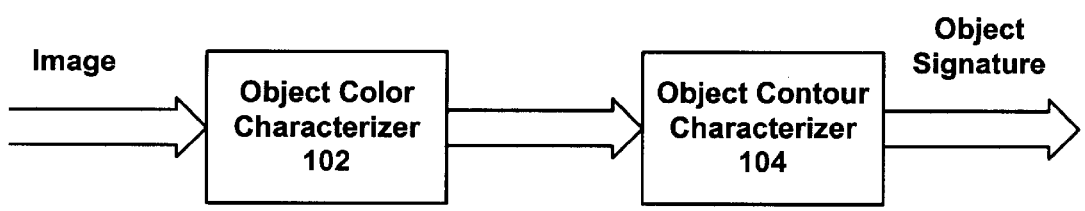
FIG. 1 is a schematic diagram showing an example of a system for characterizing an object within an image according to an embodiment of the present invention.

FIG. 1 is a schematic diagram showing an example of a system for characterizing an object within an image, according to an embodiment of the present invention. In the embodiment of FIG. 1, functional blocks are shown which can be implemented as a set of instructions residing in a storage medium and either executed by a processor or implemented as individual hardware components. The example system of FIG. 1 comprises an object color characterizer 102 and an object contour characterizer 104. To begin the process of characterizing an object within an image, the user first sends a representation of the desired image to color characterizer 102. The representation of the image may be obtained in a known manner, such as by scanning the image from a piece of paper into a digital format. Upon obtaining a representation of the image, color characterizer 102 prompts the user to identify an object within the image by highlighting an area in the image which includes the object to be characterized. Color characterizer 102 then identifies the color of the highlighted area in a known manner and sends the color information to contour characterizer 104. Using the color information received from color characterizer 102, contour characterizer 104 determines a contour of the object (in a known manner) by identifying regions of the image where the color changes from the identified color of the object to another color. The color and contour data (also referred to herein as the "object signature") are then stored with the name of the object. If the user wishes to establish a range of colors and contours for a particular object, the above steps may be repeated with other images of the same object.

Figure 2:
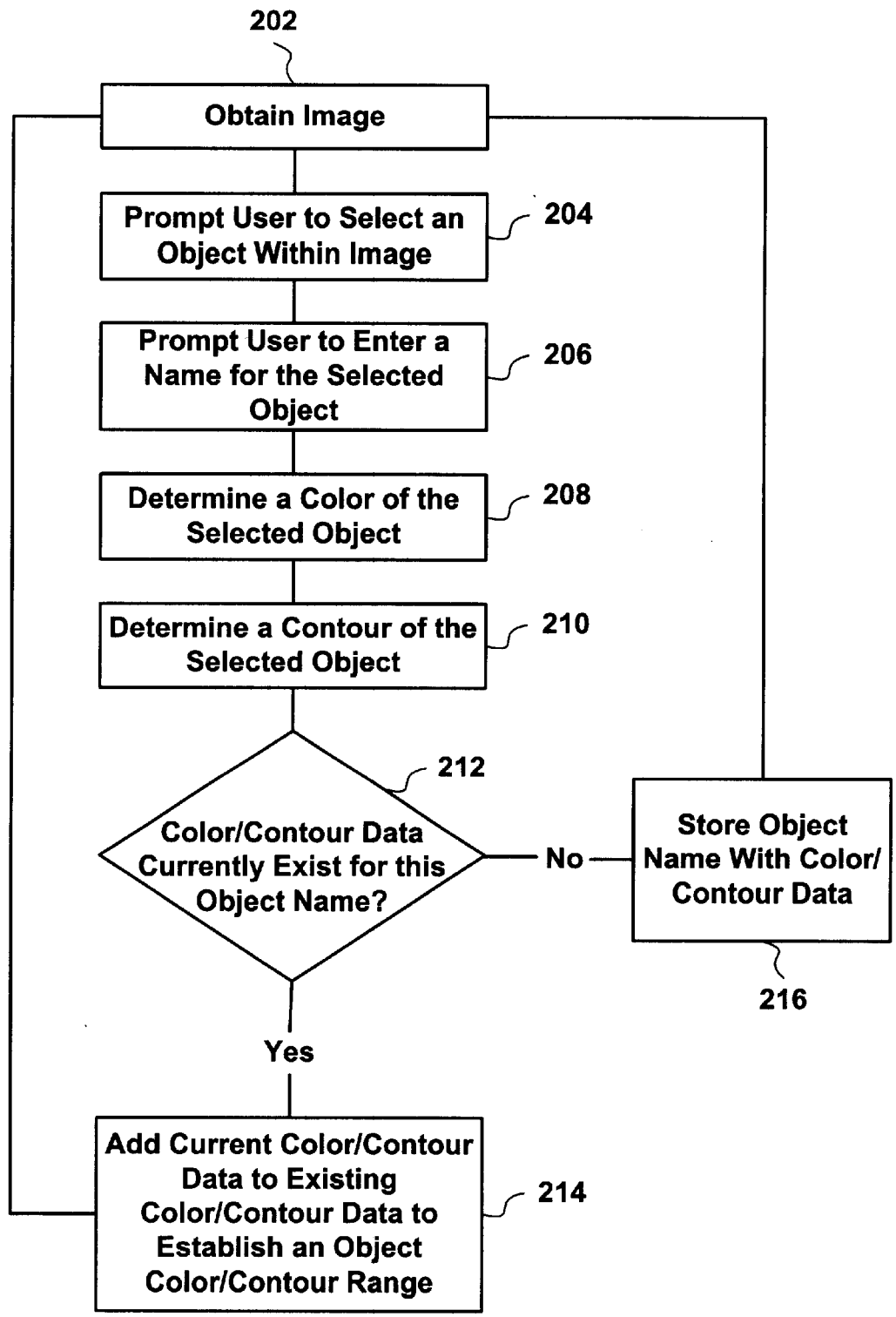
FIG. 2 is a schematic diagram showing an example of a flow chart of a method for characterizing an object within an image according to an embodiment of the present invention.

FIG. 2 is a schematic diagram showing an example of a flow chart of a method for characterizing an object within an image, according to an embodiment of the present invention. In 202, the system obtains a copy of the image which includes the object to be characterized. In 204, the system prompts the user to select an object within the image. In 206, the system prompts the user to enter a name for the selected object. Next, in 208, the system determines a color for the selected object. In 210, the system uses the color information to determine a contour for the selected object. In decision block 212, the system checks to determine whether color and contour data have been previously obtained for the name of this particular object. If so, the system proceeds to 214 and adds the current color and contour data to the existing color and contour data to establish a range of colors and a range of contours for this particular object. If, in 212, the system determines color and contour data have not been previously obtained for the name of this particular object, the system proceeds to 216 and stores the object name with the associated color and contour data. Upon completing 214 or 216, the system returns to 202.

Figure 3:
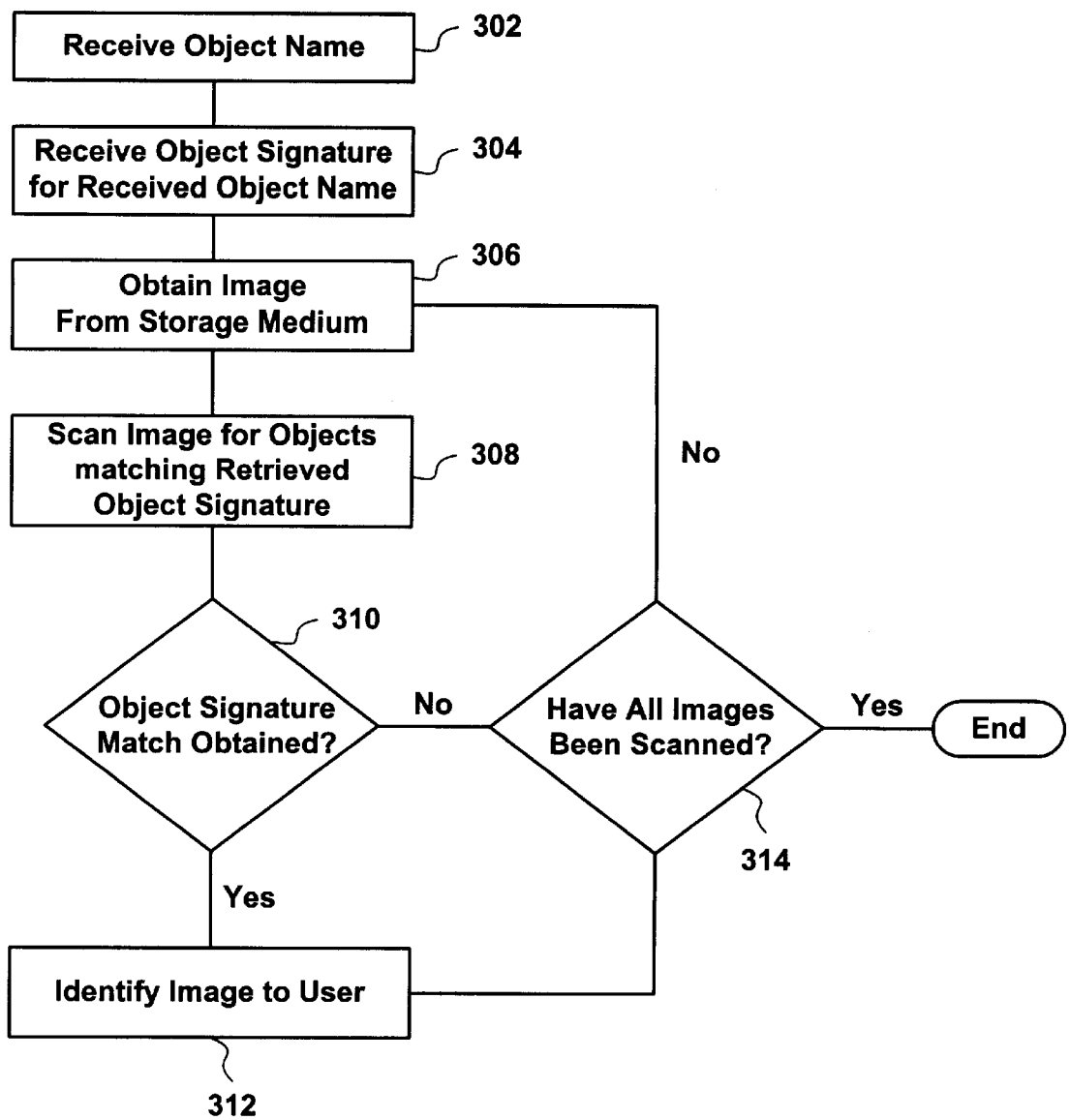
FIG. 3 is a schematic diagram showing an example of a flow chart of a method for retrieving an image from a database according to an embodiment of the present invention.

Once object signature data has been obtained for one or more objects, this data may be used to search images within a storage medium (such as a database) to identify images which include objects matching a particular object signature. For example, if an image retrieval system includes object signature data for a mountain, the system may then search a database of images to locate all images which include mountains. FIG. 3 is a schematic diagram showing an example of a flow chart of a method for retrieving an image from a database, according to an embodiment of the present invention. In 302, the system prompts the user to provide the name of an object the user wishes to appear in all retrieved images. In 304, the system obtains object signature data for the named object. The object signature data may be stored, for example, in a non-volatile memory segment. Next, in 306, the system obtains an image from the storage medium. In 308, the system scans or otherwise analyzes the obtained image for objects matching the object signature data. In decision block 310, the system determines whether the scanned image included objects matching the desired object signature. If a match was found, the system proceeds to 312 and identifies this image to the user. If no match was found, the system proceeds to 314 and determines whether all the images in the database have been scanned. If all images have been scanned, the search ends. If all images have not been scanned, the system proceeds to 306 and obtains the next image.

Figure 4:
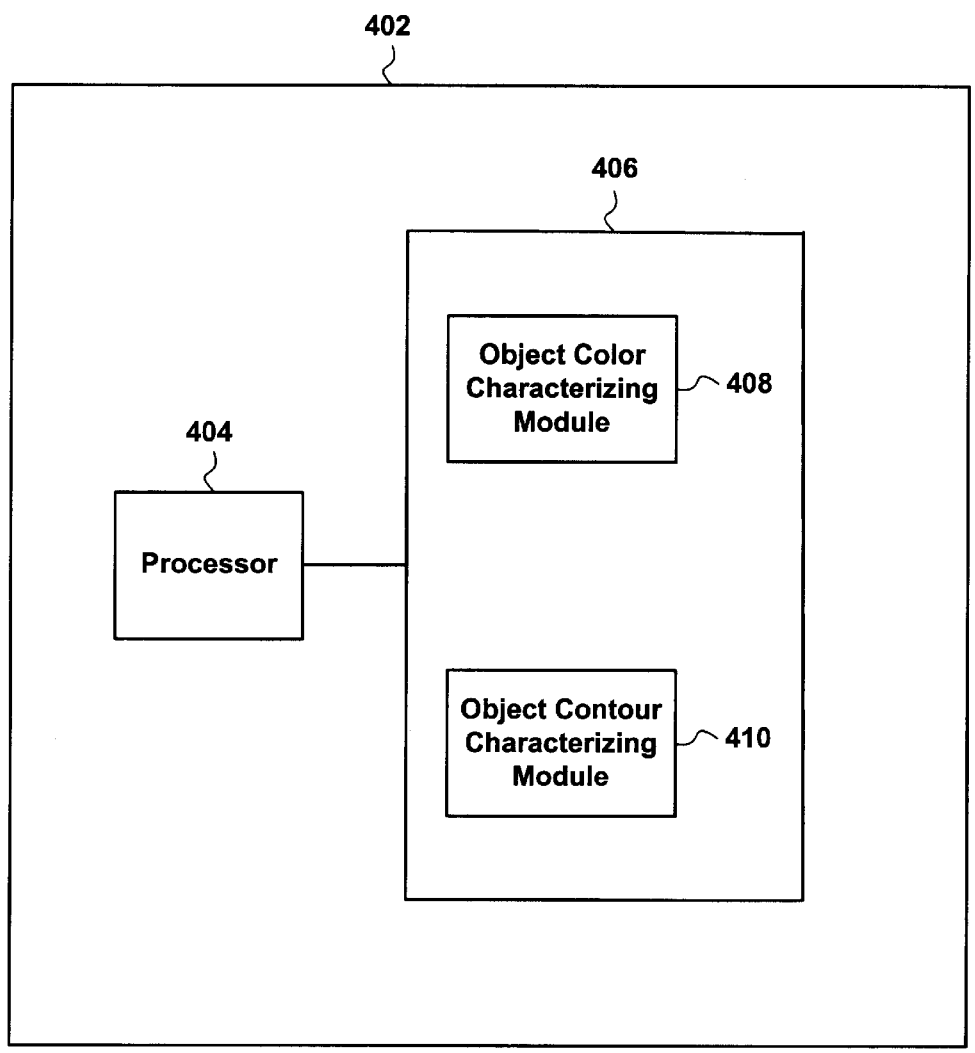
FIG. 4 is a schematic diagram showing an example of an apparatus for characterizing an object within an image according to an embodiment of the present invention.

The flow charts of FIG. 2 and FIG. 3 may be implemented, for example, as a computer program executed by a processor or the like or as computer hardware using well-known signal processing techniques. If implemented in software, the computer program instructions may be stored in a storage medium, such as Read-Only Memory (ROM), Random Access Memory (RAM), magnetic disk (e.g., 3.5" diskette or hard drive), and optical disk (e.g., Compact Disc-Read Only Memory (CD-ROM)). The stored computer programs may be executed, for example, by a general purpose computer which includes a processor. FIG. 4 is a schematic diagram showing an example of an apparatus for characterizing an object within an image, according to an embodiment of the present invention. In FIG. 4, an object characterizer 402 includes a processor 404 (e.g., the Pentium® II Processor available from Intel Corporation, Santa Clara, Calif.) adapted to be connected to a computer readable memory 406. Computer readable memory 406 stores computer program code segments which, when executed by processor 404 implement the main functionality for this embodiment of the invention. These computer program code segments are divided into two module: an object color characterizing module 408 and an object contour characterizing module 410. Although in this embodiment of the invention, the computer program code segments are shown in two separate modules, it can be appreciated that these modules can be further separated into more modules or combined together to form a single module, and still fall within the scope of the invention. An example of the operation of object color characterizing module 408 and object contour characterizing module 410 was described with reference to FIG. 2.

Figure 5:
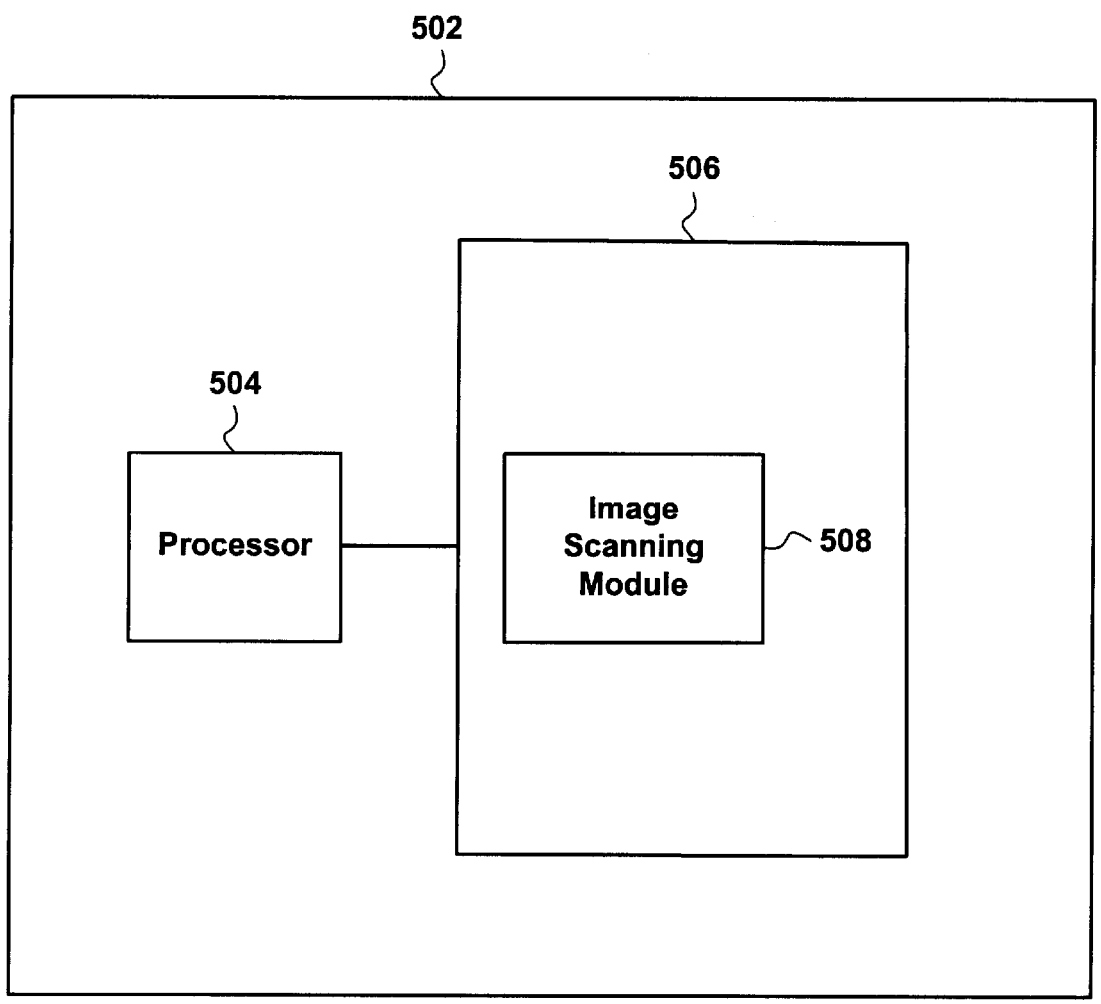
FIG. 5 is a schematic diagram showing an example of an apparatus for retrieving an image from a database according to an embodiment of the present invention.

FIG. 5 is a schematic diagram showing an example of an apparatus for retrieving an image from a database, according to an embodiment of the present invention. In FIG. 5, an image retriever 502 includes a processor 504 (e.g., the Pentium® II Processor available from Intel Corporation, Santa Clara, Calif.) adapted to be connected to a computer readable memory 506. Computer readable memory 506 stores computer program code segments which, when executed by processor 504 implement the main functionality for this embodiment of the invention. These computer program code segments are included within an image scanning module 508. Although in this embodiment of the invention, the computer program code segments are shown in one module, it can be appreciated that this module can be further separated into more modules, and still fall within the scope of the invention. An example of the operation of image scanning module 508 was described above with reference to FIG. 3.

Although several embodiments are specifically illustrated and described herein, it will be appreciated that modifications and variations of the present invention are covered by the above teachings and within the purview of the appended claims without departing from the spirit and intended scope of the invention. For example, the functions of the apparatus of FIG. 4 and the functions of the apparatus of FIG. 5 may be combined into one system.

What is claimed is:

1. A method for characterizing at least one object within an image, comprising:

identifying a color of said at least one object;

determining a contour of said at least one object by identifying regions of said image where said identified object color changes to another color;

associating a name for said at least one object with said identified color and said determined contour; and repeating said identifying, determining, and associating steps using a plurality of images of said at least one object to determine a range of colors and a range of contours for said at least one object.

2. The method of claim 1, further comprising:

storing said associated name with said determined range of colors and said determined range of contours for said at least one object.

3. The method of claim 2, further comprising:

categorizing each image according to said at least one object.

4. The method of claim 3, further comprising:

storing each categorized image within a storage medium.

5. An apparatus for characterizing at least one object within an image, comprising:

a processor;

a computer readable memory connected to said processor;

an object color characterizing module included within said computer readable memory to identify a color of said at least one object within the image; and an object contour characterizing module included within said computer readable memory to determine a contour of said at least one object by identifying regions of said image where an identified object color changes to another color, wherein said object contour characterizing module is to associate a name for said at least one object with said identified color and said determined contour and said characterizing modules are to determine a range of colors and contours for said at least one object using a plurality of images of said at least one object.

6. The apparatus of claim 5 further comprising:

a memory to store said associated name with said determined range of colors and contours for said at least one object.

7. The apparatus of claim 6 wherein said characterizing modules are to categorize each image according to said at least one object.

8. The apparatus of claim 7 wherein each categorized image is to be stored within said memory.

9. A set of instructions residing in a storage medium said set of instructions capable of being executed by a processor to implement a method for characterizing at least one object within an image, the method comprising:

identifying a color of said at least one object;

determining a contour of said at least one object by identifying regions of said image where said identified object color changes to another color;

associating a name for said at least one object with said identified color and said determined contour; and repeating said identifying, determining, and associating steps using a plurality of images of said at least one object to determine a range of colors and a range of contours for said at least one object.

10. The set of instructions of claim 9, wherein the execution of said set of instructions further comprises:

storing said associated name with said determined range of colors and said determined range of contours for said at least one object.

11. The set of instructions of claim 10, wherein the execution of said set of instructions further comprises:

categorizing each image according to said at least one object.

12. The set of instructions of claim 11, wherein the execution of said set of instructions further comprises:

storing each categorized image within a storage medium.

* * * * *